Aug. 10, 1954  J. R. SMYTH  2,686,213
BATTERY PLATE AND METHOD OF MAKING SAME
Filed Feb. 12, 1953
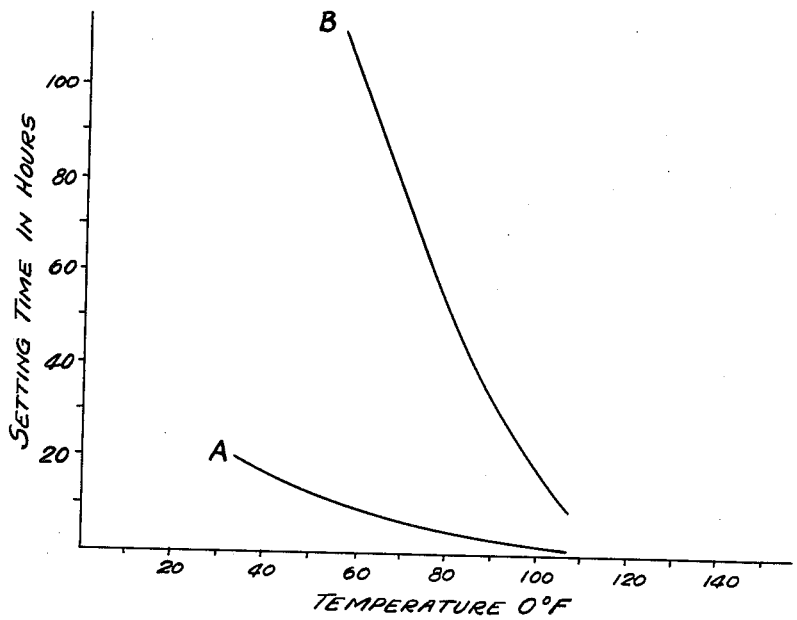
INVENTOR.
JOHN R. SMYTH
BY Hudson, Boughton,
Williams, David & Hoffmann.
ATTORNEYS Patented Aug. 10, 1954

2,686,213

UNITED STATES PATENT OFFICE 2,686,213

BATTERY PLATE AND METHOD OF MAKING SAME

John R. Smyth, Westport, Conn., assignor to The Electric Storage Battery Company, a corporation of New Jersey Application February 12, 1953, Serial No. 336,566

8 Claims. (Cl. 136—34)

The present invention relates to the manufacture of batteries and, more particularly, to the manufacture of battery plates of the pasted grid type for storage or secondary batteries of the lead-acid type. The present application is a continuation-in-part of my application Serial No. 263,173, filed December 26, 1951, now abandoned.

The principal object of the invention is the provision of a novel and improved process of manufacturing batteries and, more particularly, pasted grid type plates for lead-acid type storage batteries which comprises pasting grids of conventional construction with a paste composed essentially of amorphous or sublimed lead oxide (PbO) and setting the grids at relatively low temperatures in a medium or moderate to high humidity atmosphere to produce a new, hard and otherwise satisfactory plate.

Further objects of the invention will be apparent to those skilled in the art to which it relates from the following detailed disclosure of the invention made with reference to the accompanying drawing forming a part of this specification, in which the figure illustrates, by means of curves, the relationship between the temperature at which the setting process of the present invention is carried out and the time required to properly set the plates.

Prior to the present invention, it was impossible to make hard and otherwise satisfactory battery plates of the pasted grid type for lead-acid type storage batteries using paste containing an appreciable amount of amorphous or sublimed lead oxide (PbO). This oxide, commonly called fume oxide, as commercially known, is produced by vaporizing and condensing lead, is composed essentially, if not entirely, of hexagonal crystals having a size on the order of two microns or less, and is bright canary yellow in color. As contrasted with lead oxide made by the fume process, other litharges are basically tetragonal in structure.

According to the present invention, the paste is made in the conventional way by mixing or wetting the lead oxide with dilute sulphuric acid and in addition to sublimed lead oxide (PbO), which is the predominant ingredient, the paste may contain small quantities of other lead oxides preferably having a similarly small particle size and no metallic ingredients. Other non-metallic ingredients may include conventional plate expander material. The grids may be of any conventional construction and the pasting may be performed in the usual way, either by hand or by machines.

After the grids are pasted, the paste is set at a relatively low temperature in a moderate to high humidity atmosphere. The temperature must be below that which will cause a transformation from the hexagonal to the tetragonal form to take place. The time required to set the paste depends upon the temperature at which the plates are maintained and is preferably the minimum required to produce a satisfactory, hard plate as the plates can be overset with detrimental results. For economical reasons, the plates are preferably set at room temperature or approximately 80° F., however, other temperatures between 40° F. and 120° F. may be used.

While there is some uncertainty as to just what takes place during the so-called "setting" operation, it is believed hardness in the plate is obtained by hydration and sulfation, and that $PbSO_4$, $Pb(OH)_2$, and mixtures or complexes thereof, such as, tri-basic lead sulphate hydrate ($3PbO \cdot PbSO_4 \cdot H_2O$) are formed and that these substances give the plates their desired hard and rigid characteristics. The formation of tetra-basic lead sulfate ($4PbO \cdot PbSO_4$) is to be avoided. If the setting process is not carried on a sufficient length of time, the plates remain soft. If the setting process is continued too long, excessive crystal growth and transformation to the tetragonal form takes place and the plates again become soft. From the foregoing, it will be apparent that the temperature and duration of the setting process is critical and must be stopped at the proper time. This is accomplished by drying the plates when the setting process has reached the desired stage. Once the plates are dried, the crystal growth is stopped and does not start again upon the plates subsequently being exposed to a humid atmosphere. Forced drying is not necessary.

Assuming that the setting is carried on in moderate to high humidity atmosphere, such as, 20% to 95% relative humidity, the optimum temperature-time curve is shown in the accompanying drawing and designated A. This is essentially the minimum curve. The maximum curve for satisfactory results is shown and designated B; however, it is to be understood that some variation therefrom is contemplated. It will be apparent to those skilled in the art that the temperatures employed are far below those normally employed for setting pasted battery plates which range from 135° F. up. The usual temperatures are not satisfactory in the present instance and produce plates which are soft and otherwise unsatisfactory.

The temperatures and time employed for setting are, to some extent, functions of the plate thickness, contour, etc., and the degree of humidity employed. Moderate to high humidity is preferred as this gives better control over the process; for example, if a relatively low humidity is employed, the humidity will vary greatly throughout each plate, with the result that the plates may not be uniformly set.

The temperature-time curves shown in the drawing are for use in setting battery plates of the size now used in commercial automobile storage batteries of the lead-acid type. The setting temperatures shown range from approximately 40° F. to 100° F., however, the preferred setting temperatures are from approximately 55° F. to 90° F., with a relative humidity of from 40% to 80%, in which event the setting time may vary from approximately sixteen hours to sixty hours in the case of the lower temperatures and to forty hours in the case of the higher temperatures. Extremely satisfactory plates have been obtained with a setting temperature of approximately 60° F. and a relative humidity of approximately 40% to 80%.

If the setting time or temperature is less than that recommended, the plates are underset and are soft and fragile. If the setting time or temperature is greater than that referred to, the plates are overset and are soft, of low capacity, and have a short life.

The preferred method of setting is to hang the plates on racks. The plates are then covered with a canvas cover and permitted to stand for approximately sixteen hours in a room, the temperature of which is about 80° F. The moist plates create a sufficiently high humidity atmosphere under the canvas so that it is unnecessary to supply humidity, as in the form of steam. After the plates have stood for the desired time, they are dried, preferably by placing them in a dry atmosphere. Alternatively they may be force-dried at about 100° F. to 200° F. for approximately one to three hours.

From the foregoing, it will be apparent that the objects of the invention heretofore enumerated and others have been accomplished and that there has been provided a novel and improved method of manufacturing storage battery plates of the pasted grid type wherein the setting temperature is far below those heretofore employed.

Having thus described my invention, I claim:

1. The process of manufacturing a pasted grid type battery plate for use in a lead-acid type storage battery which comprises providing a grid, pasting the grid with a paste the active lead material of which is composed essentially of amorphous or sublimed lead oxide (PbO), and placing said pasted grid in an air atmosphere having a relative humidity of from 20% to 95% and a temperature of from 40° F. to 120° F. so that both sides are exposed thereto for not less than approximately two hours.

2. The process of manufacturing a pasted grid type battery plate for use in a lead-acid type storage battery which comprises providing a grid, pasting the grid with a paste the active lead material of which is composed essentially of amorphous or sublimed lead oxide (PbO), placing said pasted grid in a medium to high humidity air atmosphere having a relative humidity of from 20% to 95% so that both sides are exposed thereto the temperature of which atmosphere is maintained between about 40° F. to 120° F. until the paste becomes hard.

3. The process of manufacturing a pasted grid type battery plate for use in a lead-acid type storage battery which comprises providing a grid, pasting the grid with a paste the active lead material of which is composed essentially of amorphous or sublimed lead oxide (PbO), placing said pasted grid in a medium to high humidity air atmosphere having a relative humidity of from 40% to 80% so that both sides are exposed thereto the temperature of which atmosphere is maintained at approximately 55° F. to 80° F.

4. The method of setting a pasted grid type battery plate for use in storage batteries of the lead-acid type the active lead material of which is composed essentially of amorphous or sublimed lead oxide (PbO) which comprises maintaining the pasted grid in an air atmosphere having a relative humidity of from 20% to 95% and a temperature of from 40° F. to 120° F. accessible to both sides thereof until the paste becomes hard, and subsequently drying the plate.

5. The method of setting a pasted grid type battery plate for use in storage batteries of the lead-acid type the active lead material of which is composed essentially of amorphous or sublimed lead oxide (PbO) which comprises maintaining the pasted plate in a high humidity air atmosphere having a relative humidity of from 40% to 80% for from about 16 to 48 hours at a temperature of approximately 55° F. to 80° F., and immediately force drying the plate at a temperature of about 175° F. for approximately two hours.

6. A storage battery plate of the pasted grid type made in accordance with the method set forth in claim 1.

7. A storage battery plate of the pasted grid type made in accordance with the method set forth in claim 3.

8. A storage battery plate of the pasted grid type made in accordance with the method set forth in claim 5.

References Cited in the file of this patent

Storage Batteries, G. W. Vinal, 3d edition, John Wiley and Sons, New York, 1940, page 22.